(12) United States Patent
Cordeiro

(10) Patent No.: US 9,775,169 B2
(45) Date of Patent: Sep. 26, 2017

(54) REVERSE PROTOCOL FOR LOW LATENCY WIRELESS APPLICATIONS

(71) Applicant: Intel Corporation, Santa Clara, CA (US)

(72) Inventor: Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 268 days.

(21) Appl. No.: 14/507,535

(22) Filed: Oct. 6, 2014

(65) Prior Publication Data

US 2015/0117361 A1 Apr. 30, 2015

Related U.S. Application Data

(63) Continuation of application No. 12/976,649, filed on Dec. 22, 2010, now Pat. No. 8,855,088.

(51) Int. Cl.
| | |
|---|---|
| *H04W 84/12* | (2009.01) |
| *H04W 72/14* | (2009.01) |
| *H04N 21/41* | (2011.01) |
| *H04N 21/4367* | (2011.01) |
| *H04N 21/4363* | (2011.01) |

(Continued)

(52) U.S. Cl.
CPC .............. *H04W 72/14* (2013.01); *H04L 45/74* (2013.01); *H04N 21/4122* (2013.01); *H04N 21/4367* (2013.01); *H04N 21/43637* (2013.01); *H04W 80/00* (2013.01)

(58) Field of Classification Search
CPC ..... H04L 47/10; H04L 12/2865; H04L 47/14; H04L 47/22; H04L 29/06; H04L 45/00; H04L 29/12358; H04L 29/12915; H04L 61/251
See application file for complete search history.

(56) References Cited

U.S. PATENT DOCUMENTS

| | | |
|---|---|---|
| 8,855,088 B2 | 10/2014 | Cordeiro |
| 2003/0091066 A1 | 5/2003 | Choi et al. |
| 2004/0120292 A1 | 6/2004 | Trainin |

(Continued)

FOREIGN PATENT DOCUMENTS

| | | |
|---|---|---|
| WO | WO-2012088347 A2 | 6/2012 |
| WO | WO-2012088347 A3 | 6/2012 |

OTHER PUBLICATIONS

U.S. Appl. No. 12/976,649, Non Final Office Action mailed Aug. 12, 2013, 20 pgs.

(Continued)

*Primary Examiner* — Arvin Eskandarnia
*Assistant Examiner* — Thao Duong
(74) *Attorney, Agent, or Firm* — Schwegman Lundberg & Woessner, P.A.

(57) ABSTRACT

Embodiments of a system and method for communicating according to an IEEE 802.11 standard or a WiGig specification. The method includes identifying a message that requires a response from another station in less than a threshold amount of time, and that the other station cannot likely respond to within a point coordination function (PCF) interframe sequence (PIFS). The message also includes setting a reverse direction (RD) response time field in a header of an MPDU corresponding to the message to a value indicating that a response from the other station is not required within a short interframe sequence (SIFS).

18 Claims, 4 Drawing Sheets

(51) Int. Cl.
*H04L 12/741* (2013.01)
*H04W 80/00* (2009.01)

(56) References Cited

U.S. PATENT DOCUMENTS

| | | | |
|---|---|---|---|
| 2006/0050742 A1* | 3/2006 | Grandhi | H04W 74/0816 370/506 |
| 2006/0165036 A1* | 7/2006 | Chandra | H04L 47/26 370/329 |
| 2006/0268886 A1 | 11/2006 | Sammour et al. | |
| 2007/0058605 A1 | 3/2007 | Meylan et al. | |
| 2007/0171933 A1 | 7/2007 | Sammour et al. | |
| 2007/0230493 A1* | 10/2007 | Dravida | H04L 47/14 370/412 |
| 2009/0228983 A1 | 9/2009 | Qin et al. | |
| 2010/0182990 A1 | 7/2010 | Trainin et al. | |
| 2010/0189056 A1 | 7/2010 | Nishibayashi et al. | |
| 2011/0038262 A1 | 2/2011 | Nabetani et al. | |
| 2011/0096681 A1 | 4/2011 | Singh et al. | |
| 2011/0261742 A1 | 10/2011 | Wentink | |
| 2012/0127937 A1* | 5/2012 | Singh | H04W 74/0816 370/329 |
| 2012/0163353 A1 | 6/2012 | Cordeiro | |

OTHER PUBLICATIONS

U.S. Appl. No. 12/976,649, Non Final Office Action mailed Nov. 20, 2012, 20 pgs.

U.S. Appl. No. 12/976,649, Notice of Allowance mailed Jun. 5, 2014, 14 pgs.

U.S. Appl. No. 12/976,649, Response filed Jan. 10, 2014 to Non Final Office Action mailed Aug. 12, 2013, 10 pgs.

Application Serial No. 12?976,649, Response filed 0422-13 to Non Final Office Action mailed Nov. 20, 2013, 13 pgs.

International Application Serial No. PCT/US2011/066638, International Preliminary Report on Patentability mailed Jul. 4, 2013, 6 pgs.

International Application Serial No. PCT/US2011/066638, Search Report mailed Sep. 26, 2012, 3 pgs.

International Application Serial No. PCT/US2011/066638, Written Opinion mailed Sep. 26, 2012, 4 pgs.

"Part 11: Wireless LAN Medium Access Control (MAC) and Physical Layer (PHY) Specifications, Amendment 5: Enhancements for Higher Throughput", IEEE 802.11n. Local and metropolitan area networks. IEEE Computer Society., (Oct. 29, 2009), 536 pgs.

* cited by examiner

REVERSE PROTOCOL FOR LOW LATENCY WIRELESS APPLICATIONS

PRIORITY APPLICATION

This application is a continuation of U.S. application Ser. No. 12/976,649, filed Dec. 22, 2010, now issued as U.S. Pat. No. 8,855,088, which is incorporated herein by reference in its entirety.

BACKGROUND

Wireless display devices will likely become very common in the near future. In order to use these wireless display devices, a communication protocol must be used to send the video information from the video origination device to the display device. The quality of service (QoS) requirements for wireless display applications can vary, but in general can be quite demanding. Many users have become accustomed to a higher quality of video images (e.g., improved color depth, screen refresh rate, and screen resolution). These higher quality video images, however, only increase the QoS demands further. For example, a high-definition multimedia interface (HDMI) connection requires 3 Gbps of bandwidth with a latency of less than 16.6 ms.

Moreover, many video streams use a content protection protocol, such as high-bandwidth digital content protection (HDCP), to protect the video stream from unauthorized copying. These content protection protocols can require a low latency message exchange to authenticate a receiving device (e.g., display device) before a stream is transmitted to the receiving device. HDCP, for example, has a round trip time (RTT) protocol that requires a receiving device to respond to a challenge message (RTT Challenge) with an appropriate response (RTT Response) within a defined latency period. In HDCP, the RTT Response message must be received within either 1) less than 1 ms—allowing 1023 tries or 2) less than 7 ms—allowing 3 retries. These low latency requirements are used to verify that the receiving device is nearby the video source. If the receiving device cannot meet the latency period within the number of tries provided, the video source will not send the video information to the receiving device and the video session is terminated.

These requirements are typically not difficult to meet when the video source is nearby to and has a wired connection with the receiving device. Wireless coupling, however, is typically much slower than wired coupling. Thus, the latency requirements can be difficult to meet when the display device is wirelessly coupled to the video source.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In accordance with embodiments, it may be desirable to have a wireless display device that can meet the latency requirements of a content protection mechanism while using an Institute of Electrical and Electronic Engineers (IEEE) 802.11 standard or a WiGig specification.

Figure 1:
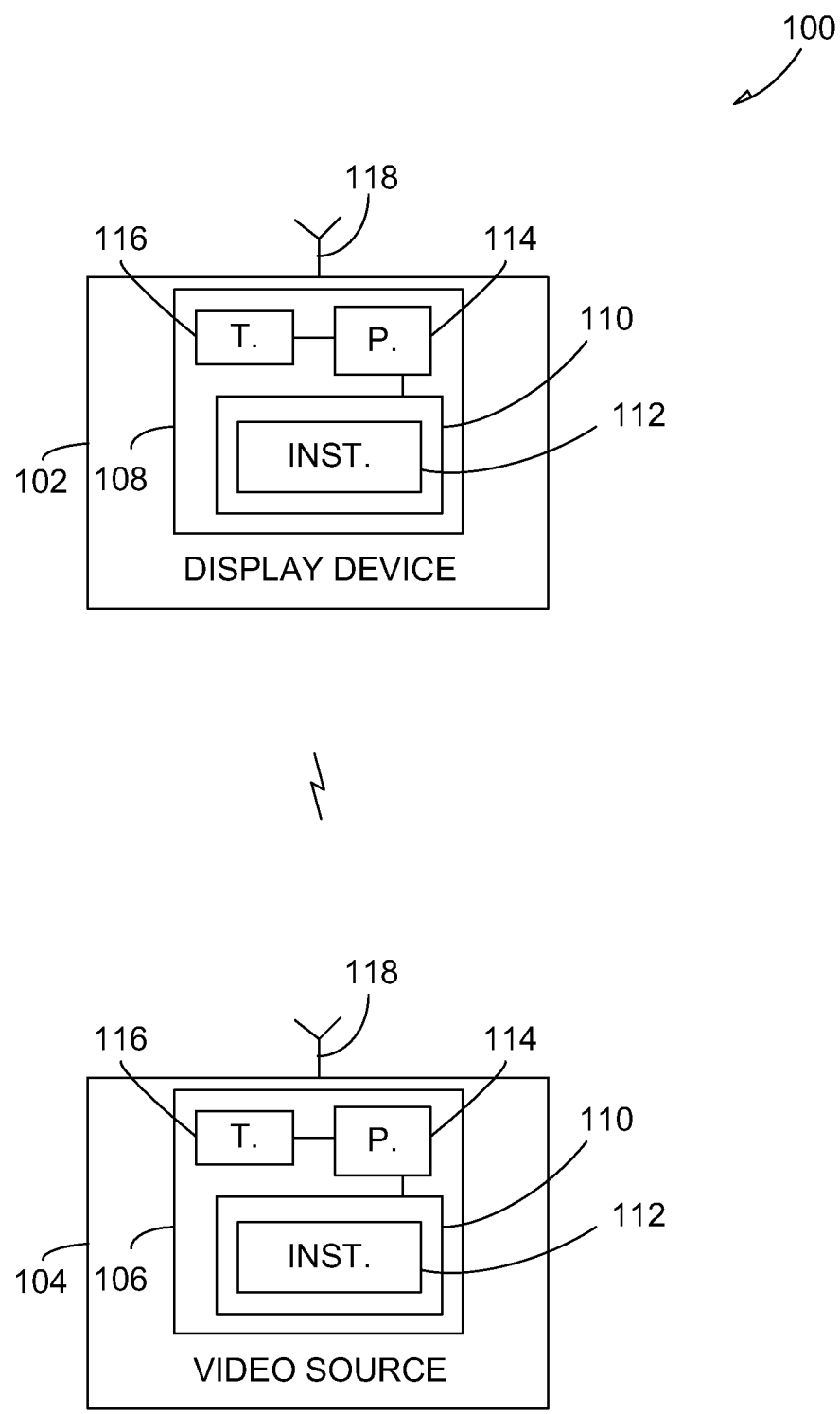
FIG. 1 illustrates an example of a wireless communication system in accordance with embodiments.

FIG. 1 illustrates an example of a wireless communication system 100. The wireless communication system 100 can include one or more display devices 102 in wireless communication with a video source device 104. The video source device 104 can be collocated with a wireless communication station 106 configured to communicate with another wireless communication station 108 collocated with the display device 102. Each wireless communication station 106, 108 can include a memory 110 having instructions 112 thereon for execution by a processor 114. The processor 114 can be coupled to transceiver 116 for radiating and sensing signals via an antenna 118. As used herein, the processor 114 can be "configured" to accomplish a particular task when the memory 110 includes instruction 112 that can be executed by the processor 114 to accomplish the particular task.

In some examples, the video source 104 can include a DVD player, BluRay player, set-top box, game console, mobile device, computing device, or other source of video information. The some examples, the display device 102 can be a monitor, television, mobile device (e.g., a notebook, tablet, mobile phone), or other device having a display. In an example, the stations 106, 108 can be configured to communicate with other wireless stations according to one or more Institute of Electronics and Electrical Engineers (IEEE) 802.11 standards. For example, the stations 106, 108 can be configured to communicate according to an 802.11a, 802.11b, or 802.11c standard as defined by the IEEE 802.11-2007 specification, or an 802.11n standard as defined by an IEEE 802.11n-2009 specification, or an 802.11ad, or an 802.11ac standard, as well as future 802.11 standards. In other examples, the stations 106, 108 can be configured to communicate according to a Wireless Gigabit Alliance (WiGig) specification.

In an example, the video source 104 and display device 102 can be configured to produce and display, respectively, video content that is subject to a content protection protocol. For example, the video source 104 and display device 102 may be compliant with the high definition content protection (HDCP) protocol which is one example of a content protection protocol. In other examples, other content protocols may be used.

Figure 2:
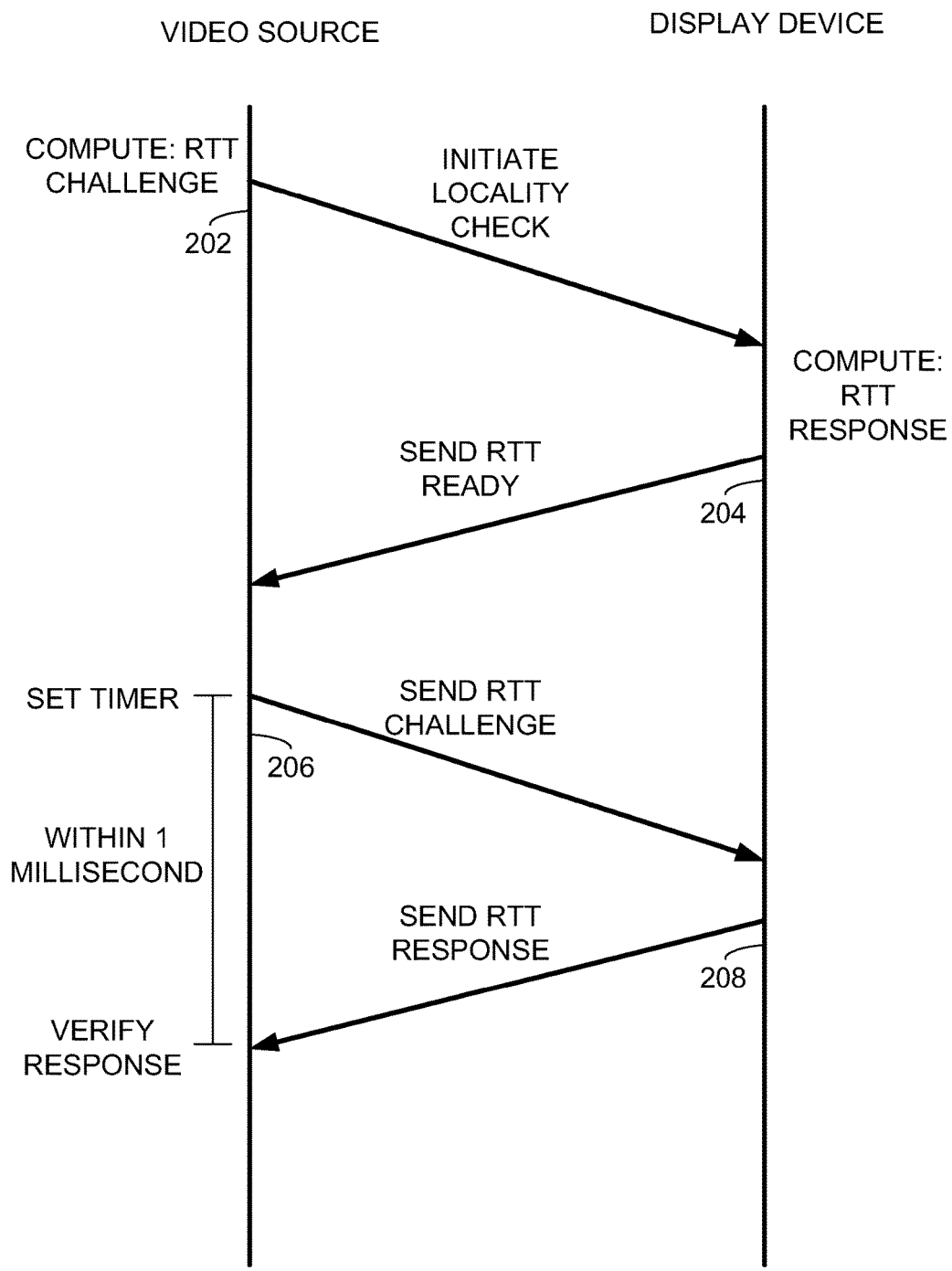
FIG. 2 illustrates an example of HDCP locality check protocol.

FIG. 2 illustrates a locality check protocol corresponding to the HDCP protocol. The HDCP protocol includes a locality check to verify whether the display device 102 is local to the video source 104. At 202, the video source 102 initiates the locality check by sending an initiation message to the display device 102. The initiation message includes a computation for the display device 102 to perform. The computation verifies that the display device 102 is compliant with the HDCP protocol. The display device 102 receives the initiation message, performs the computation, and at 204, returns a ready message to the video source 104. The ready message indicates that the display device 102 is ready for the round trip time (RTT) challenge from the video source 104. At 206, the video source 104 then sends the RTT challenge message and starts a watchdog timer to time the response from the display device 102. At 208, the display device 102 responds to the RTT challenge with the RTT response message when the RTT challenge is received. In this example, the video source 104 must receive the RTT response message within 1 ms of sending the RTT challenge message. The display device 102 is given three tries to complete the RTT response within the threshold time (1 ms).

Responding within this short time period can be difficult when using an 802.11 standard. In an 802.11 standard, access to the medium for a transmitting is typically granted on a contention basis. Accordingly, the display device 102, after receiving the RTT challenge message may not be able to gain access to the medium within the 1 ms required for the RTT response message.

One option for improving the response time of display device 104 using an 802.11 standard is to use the reverse direction (RD) protocol defined within the 802.11 standard. The RD protocol allows a first wireless station (also referred to herein as an "RD initiator") to relinquish the medium access time (e.g., the transmission opportunity (TXOP) or service period (SP)) granted to it to another wireless station (also referred to herein as an "RD responder"). Using the example of FIG. 1, the station 106 would comprise a RD initiator station and the station 108 would comprise the RD responder station. Thus, the reverse direction protocol could be used with a RTT challenge message from the video source 104. The video source 104 could identify when an RTT challenge message is to be sent, and relinquish its granted access to the display device 102 to enable the display device 102 to respond without have to negotiate access to the medium. In other examples, the RD protocol could be used with other messages that require a response in less than a threshold (e.g., 1 ms) amount of time.

To initiate a RD from the video source 104, the video source 104 sets the reverse direction grant (RDG)/more physical protocol data unit (PPDU) field in a header of a MPDU sent to the display device 102. To grant the RD to the display device 102, the RDG/more PPDU bit is set to a value of one, otherwise, the RDG/more PPDU field is set to a value of zero. The display device 102 can receive the MPDU and check the value of the RDG/more PPDU field. If the RDG/more PPDU field is set to one the display device 102 knows that the video source 104 has granted the display device 102 access to the medium.

In one example, a response from the display device 104 can be required within a short interframe space (SIFS) of the MPDU having the RDG/more PPDU field set to one. The amount of time granted by an SIFS can depend on the particular 802.11 standard used, but is set at a defined value for each 802.11 standard. In 802.11b for example, a SIFS is approximately equal to 20 usec. In 802.11ad, however, a SIFS is approximately equal to 3 usec.

It can be difficult, however, for the display device 102 to respond with a RTT response within a SIFS. This is because the content protection protocol is within the application layer of the protocol stack of the display device 102. Thus, the RTT challenge message must be propagated up the protocol stack to the application layer, the RTT response is created in the application layer, and the RTT response must then be propagated down the protocol layer for transmission to the video source 104.

In an example, in order to respond within a SIFS, the display device 102 can continually respond by sending null frames to the video source 104. Once the display device 102 responds within SIFS, the display device 102 has continual access to the medium until the display device 102 indicates that it is done, until the TXOP/SP granted to the video source 102 ends, or until a SIFS time period passes from the last frame. The display device 102 can indicate that it is done by setting the RDG/more PPDU field to zero in a MPDU sent to the video source 104. Accordingly, as long as the display device 102 continually sends the null frames the display device 102 can maintain access to the medium until the RTT response is ready and can be sent.

In another example, the display device 102 can immediately indicate that it is done (e.g., grant the medium back to the video source 104) while still generating the RTT response message. The video source 104 upon being re-granted the medium can immediately re-grant the medium back to the display device 102. This back and forth granting of the medium can occur until the display device 102 is ready to transmit the RTT response. At that time, the display device 102 can transmit the RTT response when is has been granted the medium.

FIGS. 4A and 4B illustrate other examples of lower power methods of satisfying a low latency response. Here, the video source 104 can grant the display device 102 the freedom to respond after an RD grant outside of a SIFS. As mentioned above, a response after an RD grant is typically required within a SIFS of the RD grant. The video source 104, however, may wait for a point coordination function (PCF) interframe sequence (PIFS) before determining that the display device 102 is not responding to the RD grant. In this example, however, the video source 104 allows the display device 102 to take longer to respond than the SIFS (or PIFS) time period. This grant of extended time can include the time after the RD grant and the time between frames sent by the display device 102 back to the video source 104. This extended time, however, can end once the display device 102 grants the medium back to the video source 104.

In an example, the video source 104 can indicate that a response is not required within a SIFS by setting a field in a header of the MPDU. This field is referred to herein as the "RD response time" field. In an example, when the RD response time field is zero, a response from the display device 102 is required within SIFS time. When the RD response time field is one, a response from the display device is not required within SIFS. With this field, the video source 104 can notify the display device 102 of the requirements for the response frame. Granting the display device 102 extended time to respond would enable the display device 102 to respond as soon as the RTT response message is generated, without having to continually transmit null frames or pass back-and-forth the medium.

Figure 3A:
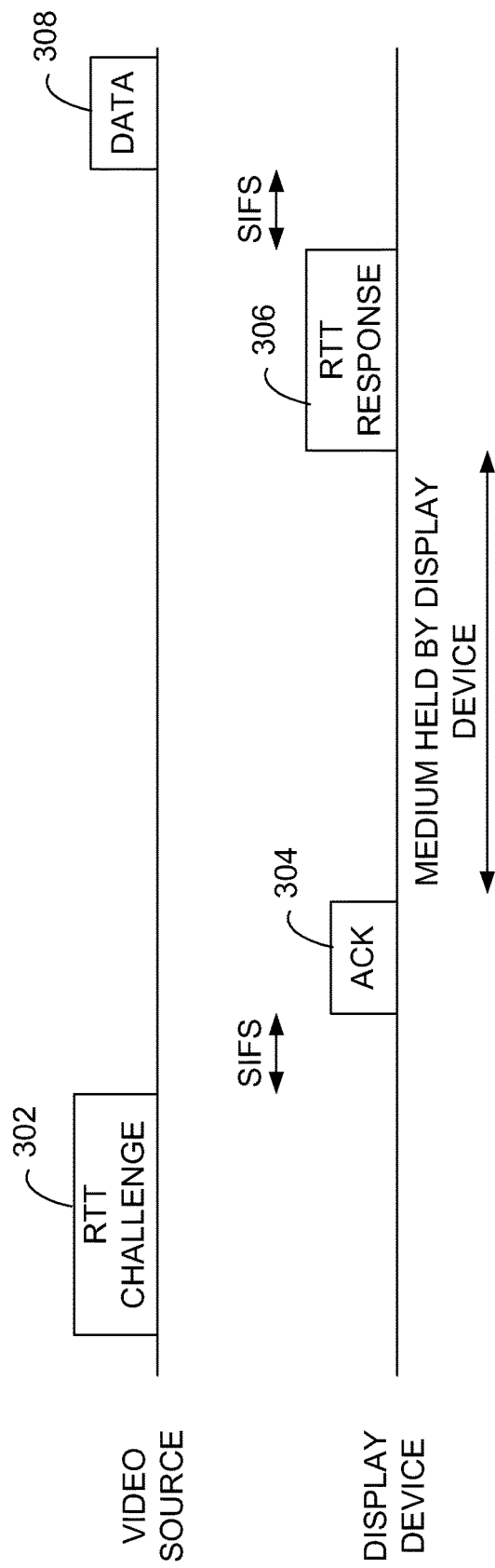
FIGS. 3A and 3B illustrate example methods for low latency responses from a wireless station using an 802.11 standard or a Wireless Gigabit Alliance (WiGig) specification.

FIG. 3A illustrates one example of a method for extended response time. At 302 a RTT challenge message is sent from the video source 104 to the display device 102. The RTT challenge message can be at least partially included within an MPDU having a RDG/more PPDU field set to one and a RD response time field also set to one. At 304, the display device 102 receives the RTT challenge message, checks the RGD/more PPDU field and the RD response time field. Since the RDG/more PPDU field is set to one and the RD response time field is set to one, the display device 102 knows that it has been granted access to the medium and does not have to response within SIFS. Accordingly, the display device 102 can send a block acknowledgement and wait until the RTT response message is ready before sending another PPDU to the video source 102. The display device 102 can wait without transmitting regardless of whether a SIFS has passed. At 306, the display device 102 can send the RTT response message to the video source 104. At 308, the video source 104 can then continue by transmitting other information.

Figure 3B:
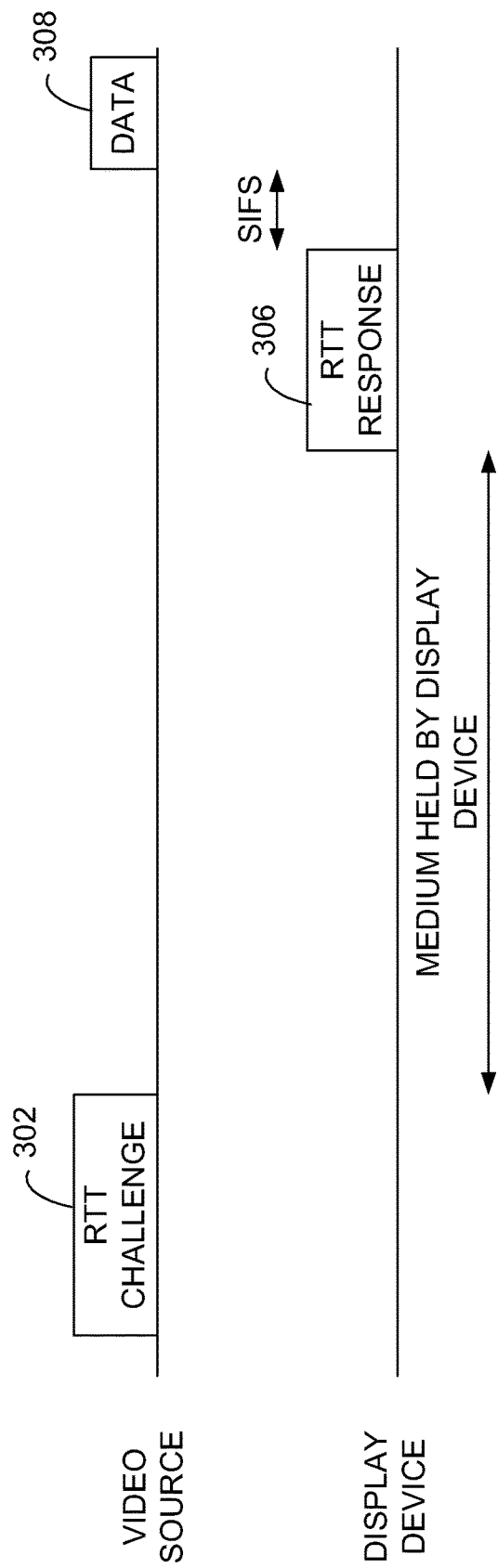

Notably, after the video source 104 performs a RD grant and grants the medium to the display device 102 with the RD response time field set to one, the video source 104 holds without transmitting in the TXOP/SP until the display device 102 grants the medium back to the video source 104. The video source 104 holds regardless of whether a SIFS or PIFS has occurred between frames. FIG. 3B illustrates a similar method to FIG. 3A, except the block acknowledgement at 304 is not received from the display device 102.

Although the above description in written in terms of a RTT challenge message, in other examples, the RD protocol described above could be used with other messages that require a response in less than a threshold (e.g., 1 ms) amount of time and that the RD responder is unlikely to be able to respond to within a SIFS or PIFS time period. Messages meeting this criteria could be identified by the RD initiator and the RD response time field could be set to one to accommodate the response.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A wireless device, configured to operate according to a wireless protocol, the wireless device including one or more processors comprising circuitry to:
   identify a message to send to a recipient wireless device;
   determine that the recipient wireless device will be unable to respond to the message in time as defined by the wireless protocol for a response to a message sent with a reverse direction grant by at least an identification of the message as a Round Trip Time (RTT) challenge message of a High Definition Content Protection (HDCP) protocol;
   responsive to the determination that the recipient wireless device will be unable to respond to the wireless device in time as defined by the wireless protocol:
   set a first field of a message header of the message to a value indicating that a reverse direction grant has been granted; and
   set a second field of the message header to a value indicating that a response from the recipient is not required within a time period defined by the wireless protocol for a response to the message sent with the reverse direction grant, wherein the message header is a Medium Access Control (MAC) header;
   send the message to the recipient wireless device, the message including the message header; and
   hold a transmission opportunity for the recipient wireless device until a response message is received from the recipient having a message header field indicating that the recipient is relinquishing the transmission opportunity.

2. The wireless device of claim 1, wherein the wireless protocol is an Institute for Electrical and Electronics Engineers (IEEE) 802.11 standard.

3. The wireless device of claim 1, wherein the first field of the message header is a Reverse Direction Grant (RDG)/more Physical Protocol Data Unit (PPDU) field.

4. The wireless device of claim 1, wherein the second field of the message header is a reverse direction response time field, which indicates that a response is not required within the time period defined by the wireless protocol.

5. The wireless device of claim 1, wherein the time period defined by the wireless protocol is a Short Interframe Sequence (SIFS).

6. The wireless device of claim 1, wherein the message header field of the response indicating that the recipient is relinquishing the transmission opportunity is a RDG/more field.

7. A non-transitory machine-readable medium that stores instructions, which when for execution by one or more processors of a wireless communication device to configure a wireless device to perform operations to:
   identify a message to send to a recipient wireless device using a wireless protocol;
   determine that the recipient will be unable to respond to the message in time as defined by the wireless protocol for a response to a message sent with a reverse direction grant comprises an identification of the message as a Round Trip Time (RTT) challenge message of a High Definition Content Protection (HDCP) protocol;
   responsive to the determination that the recipient will be unable to respond to the wireless device in time as defined by the wireless protocol:
   set a first field of a message header of the message to a value indicating that a reverse direction grant has been granted; and
   set a second field of the message header to a value indicating that a response from the recipient is not required within a time period defined by the wireless protocol for a response to the message sent with the reverse direction grant, wherein the message header is a Medium Access Control (MAC) header;
   send the message to the recipient wireless device, the message including the message header; and
   hold a transmission opportunity for the recipient wireless device until a response message is received from the recipient having a message header field indicating that the recipient is relinquishing the transmission opportunity.

8. The machine-readable medium of claim 7, wherein the wireless protocol is an Institute for Electrical and Electronics Engineers (IEEE) 802.11 standard.

9. The machine-readable medium of claim 7, wherein the first field of the message header is a Reverse Direction Grant (RDG)/more Physical Protocol Data unit (PPDU) field.

10. The machine-readable medium of claim 7, wherein the second field of the message header is a reverse direction response time field.

11. The machine-readable medium of claim 7, wherein the time period defined by the wireless protocol is a Short Interframe Sequence (SIFS).

12. The machine-readable medium of claim 7, wherein the message header field of the response indicating that the recipient is relinquishing the transmission opportunity is a RDG/more field.

13. A method comprising:
  identifying a message to send to a recipient wireless device using a wireless protocol;
  determining that the recipient will be unable to respond to the message in time as defined by the wireless protocol for a response to a message sent with a reverse direction grant comprises identifying the message as a Round Trip Time (RTT) challenge message of a High Definition Content Protection (HDCP) protocol;
  responsive to determining that the recipient will be unable to respond to the wireless device in time as defined by the wireless protocol:
  setting a first field of a message header of the message to a value indicating that a reverse direction grant has been granted; and
  setting a second field of the message header to a value indicating that a response from the recipient is not required within a time period defined by the wireless protocol for a response to the message sent with the reverse direction grant, wherein the message header is a Medium Access Control (MAC) header;
  sending the message to the recipient wireless device, the message including the message header; and
  holding a transmission opportunity for the recipient wireless device until a response message is received from the recipient having a message header field indicating that, the recipient is relinquishing the transmission opportunity.

14. The method of claim 13, wherein the wireless protocol is an Institute for Electrical and Electronics Engineers (IEEE) 802.11 standard.

15. The method of claim 13, wherein the first field of the message header is a Reverse Direction Grant (RDG)/more physical protocol data unit (PPDU) field.

16. The method of claim 13, wherein the second field of the message header is a reverse direction response time field.

17. The method of claim 13, wherein the time period defined by the wireless protocol is a Short Interframe Sequence (SIFS).

18. The method of claim 13, wherein the message header field of the response indicating that the recipient is relinquishing the transmission opportunity is a RDG/more field.

* * * * *